United States Patent [19]

Hirmann

[11] Patent Number: 4,925,199
[45] Date of Patent: May 15, 1990

[54] DRIVE DEVICE

[76] Inventor: Georg Hirmann, Griesernweg 14, 8037 Zürich, Switzerland

[21] Appl. No.: 187,538
[22] PCT Filed: Aug. 6, 1987
[86] PCT No.: PCT/CH87/00096
§ 371 Date: Apr. 6, 1988
§ 102(e) Date: Apr. 6, 1988
[87] PCT Pub. No.: WO88/00902
PCT Pub. Date: Feb. 11, 1988

[30] Foreign Application Priority Data

Aug. 7, 1986 [CH] Switzerland ............... 3170/86
Oct. 14, 1986 [CH] Switzerland ............... 4107/86
May 13, 1987 [CH] Switzerland ............... 1835/87

[51] Int. Cl.$^5$ ............................................. B62M 1/04
[52] U.S. Cl. ........................................ 280/216; 74/143; 280/253
[58] Field of Search ............... 74/128, 129, 142, 143; 280/216, 218, 252, 253, 254, 244, 215

[56] References Cited

U.S. PATENT DOCUMENTS

| | | | |
|---|---|---|---|
| 394,890 | 12/1888 | Staeber | 280/253 |
| 442,980 | 12/1890 | James | 280/252 |
| 549,397 | 11/1895 | Savorgnan | 280/253 |
| 614,992 | 11/1898 | Schmidt | 280/253 X |
| 618,330 | 1/1899 | Campbell | 280/253 X |
| 2,149,623 | 3/1939 | Nigro | 280/216 |
| 2,831,703 | 4/1958 | Shrimpton | 280/254 |
| 3,362,723 | 1/1968 | Bretholz | 280/253 |
| 3,998,469 | 12/1976 | Ruys | 280/254 |
| 4,411,442 | 10/1983 | Rills | 280/254 X |

FOREIGN PATENT DOCUMENTS

462352 3/1937 United Kingdom ............... 280/216

Primary Examiner—Charles A. Marmor
Assistant Examiner—Michael Mar

[57] ABSTRACT

A drive device for a rotating part, in particular a vehicle axle, has at least one digital mechanical drive having an active wedge and associated drive devices which produce, structurally predetermined or optionally from different forms of energy, pulses which are direct-driving or, via energy buffer storage, proportional to path or angle. Such a drive device is useful in vehicles which are driven by human force or in stationary installations. It includes a mechanical pulse drive which, depending on the design, is driven optionally either by human force and/or pressure fluid. A pumping device (6) diverse a part of the drive energy for filling a ppressure accumulator. A control valve (19) and a working member permit pulse-wise connection of a force amplifier (18). This pulse drive of digital character represents a direct drive with human force in the form of mechanical pulses. It stores surplus energy which has been fed in, and then, as a force amplifier, makes it available as needed.

55 Claims, 9 Drawing Sheets

FIG. 29 ic
DRIVE DEVICE

BACKGROUND OF THE INVENTION

The present invention relates to a drive device for a rotating part, in particular a vehicle axle.

Modern bicycles and other similar devices which are driven by human force are customarily moved by rotating drive elements.

SUMMARY OF THE INVENTION

The required drive energy must always be made available by man, corresponding to what is required at the time.

The present invention represents pulse drives of digital character which permit a direct drive with physical force in the form of mechanical pulses, store energy surpluses fed in, and, as a force amplifier, makes them available as needed.

Such a drive device is characterized by the features disclosed and claimed herewith.

BRIEF DESCRIPTION OF THE DRAWINGS

The invention will be explained below by way of example with reference to the drawing, in which.

DETAILED DESCRIPTION

Figure 1:
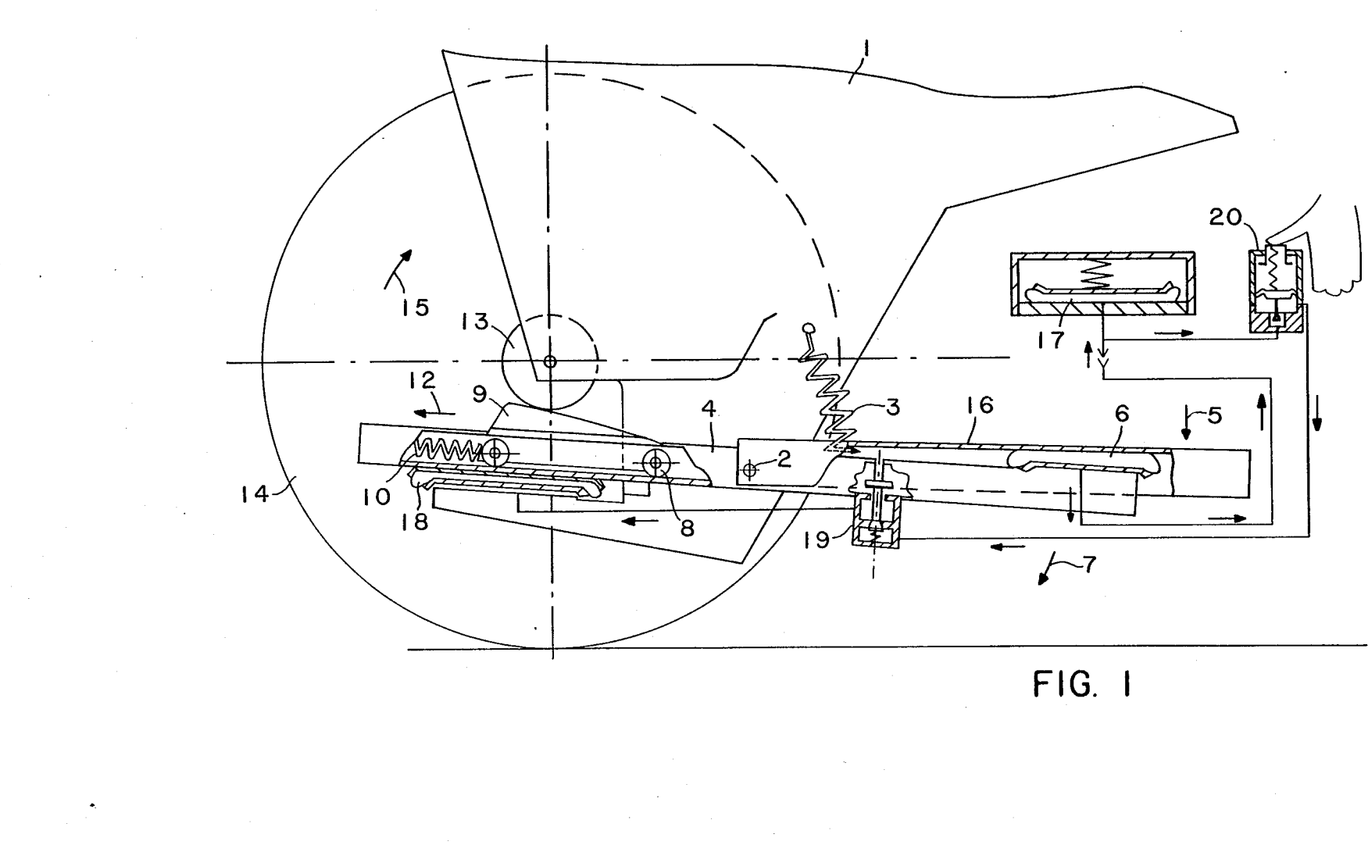
FIG. 1 shows an embodiment of a drive pedal of a bicycle having complex functions.

One embodiment of a drive pedal of a bicycle with complex functions is shown in FIG. 1. The lever 4, which is pivotally suspended on pivot point 2 on the frame 1 and held by a spring 3 as well as a stop, has the following functions: By foul pressure applied in the direction of arrow 5 to pedal 16 supported by pump cell 6, the lever 4 is moved in direction 7, whereupon the active wedge 9 guided by rollers 8 within the lever 4 moves, in opposition to return compression spring 10, in the direction 12 and, at the same time, the friction wheel 13 and the wheel 14 which is rigidly coupled to it move in the direction of arrow 15.

Upon the release of the lever 4 from load, it is brought to the initial position by spring 3 and the wedge 9 is moved back into its initial position by spring 10.

The manner of operation described above corresponds to the direct tangential-force pulse-drive with the active H-STEP wedge.

The pump cell 6 which is present below the pedal 16 serves to divert a part of the drive energy, to pressure accumulator 17 which can be connected as required, via control valve 19 and pressure regulator 20, to force cell 18 which acts as a force amplifier.

In this way, it is possible to impart to a bicycle, particularly in city traffic, an ability to accelerate as a result of which when a traffic control signal turns green the need for an automobile to overtake or pass such bicycle is reduced.

The buffered storage of this type can also help in getting up short inclines. The low construction of the bicycle which is possible provides a substantial contribution to safety in travel.

The drive device shown can, depending on the specific use and purpose, be used:
either alone or on both sides
only mechanically
mechanically with an pneumatic storage and with additional wedge motor
mechanically with pneumatic storage and with a force amplifier (see FIG. 1)
only pneumatically via buffer storage with a pneumatic wedge motor.

In order to adapt or change of the pulse transmission ratio the wedge 9 can be replaced by a different-sized wedge, for instance, or shifted laterally so as to engage a friction wheel with a different diameter. By the shaping of the drive surface of the wedge, a pulse of uniform or other shape can be produced.

For providing a mechanical pulse for uniform movement in the case of a swing-pedal drive, an involute shape results in a constant wedge thrust angle.

Similar pulse drives can—with or without storage—also serve for the rotating drive of stationary devices such as fans, centrifuges, winding and, grinding wheels, as well as for the linear advance of objects or for push means for the moving of loads.

Figures 2, 3:
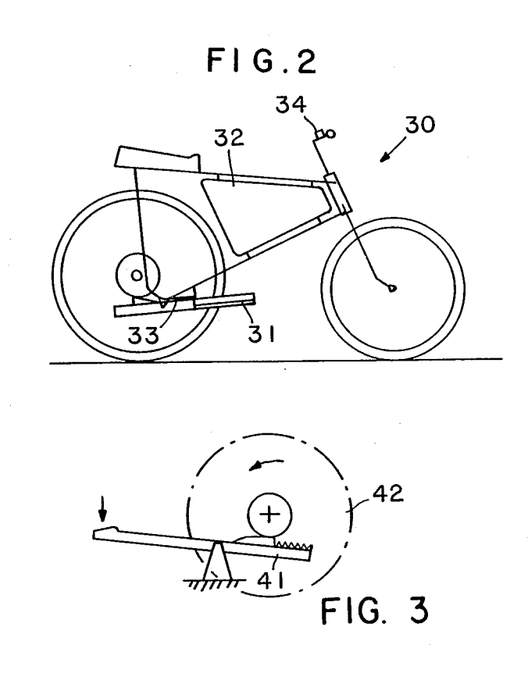
FIG. 2 shows a bicycle-like two-wheel vehicle.
FIG. 3 shows a pulse drive of a fan rotor.

FIG. 2 shows a bicycle-like two-wheel vehicle 30 having a single pulse drive 31, storage 32, force accumulator 33 and pressure regulator 34.

FIG. 3 shows a pulse drive 41 of a fan motor 42.

Figure 4:
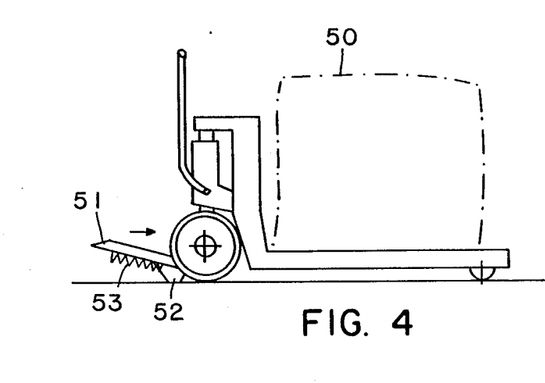
FIG. 4 shows a direct forward advance of a load.

FIG. 4 shows a direct foward pushing of a rolling load 50 by pedal 51 with the active wedge 52 and return spring 53.

Figure 5:
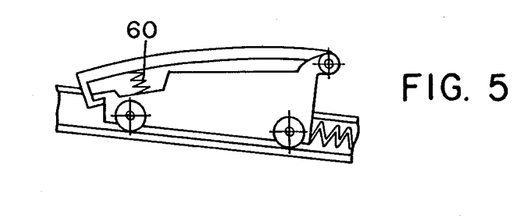
FIG. 5 shows a wedge-drive surface which changes position as a function of the load.

FIG. 5 shows an active wedge having an angle which is adjustable as a function of the load with respect to the spring 60.

Figure 6:
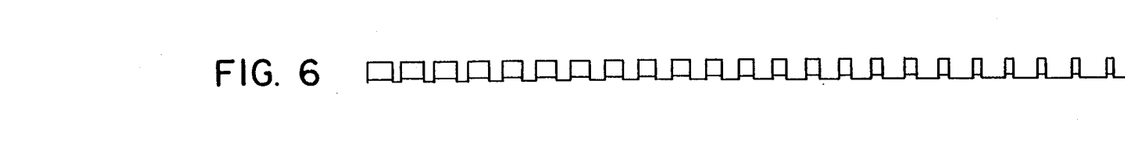
FIG. 6 shows pulse trains which represent the acceleration process.

FIG. 6 shows pulse shapes during acceleration.

Figure 7:
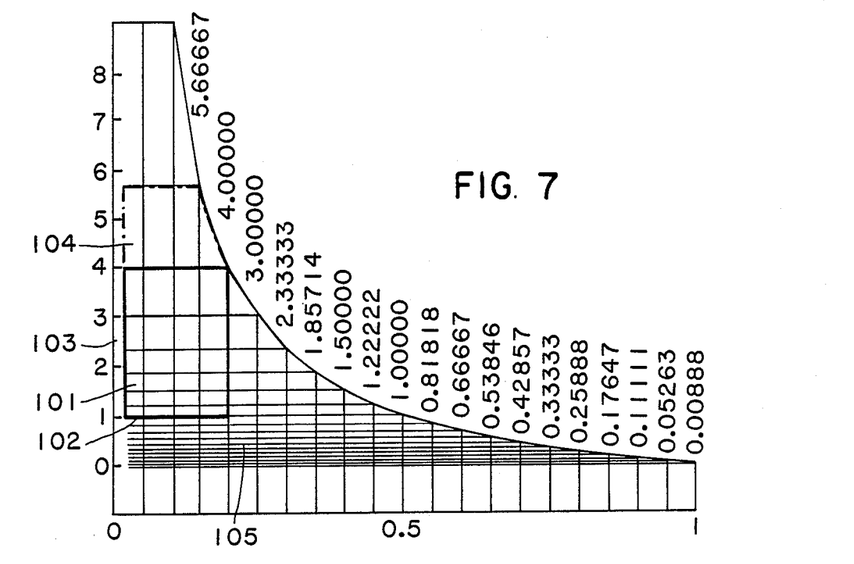
FIG. 7 shows the pressure region of an ordinary pneumatic system.

FIG. 7 in the form of a P,V diagram shows the normal operating range 101 with a minimum pressure 102 of 0.1 bar, compression-chamber residual volume 103 and pressure-regulation region 104. The loss fields 103, 104 and 105 show the volumetric losses without the mechanical and thermal losses of the compressor. The purpose of the invention is to provide pneumatic drive systems which, by avoiding the mechanical hysteresis on the part of the user, operate within a lower pressure region and can conduct a larger quantity of air with the smallest possible turbulence.

Figure 8:
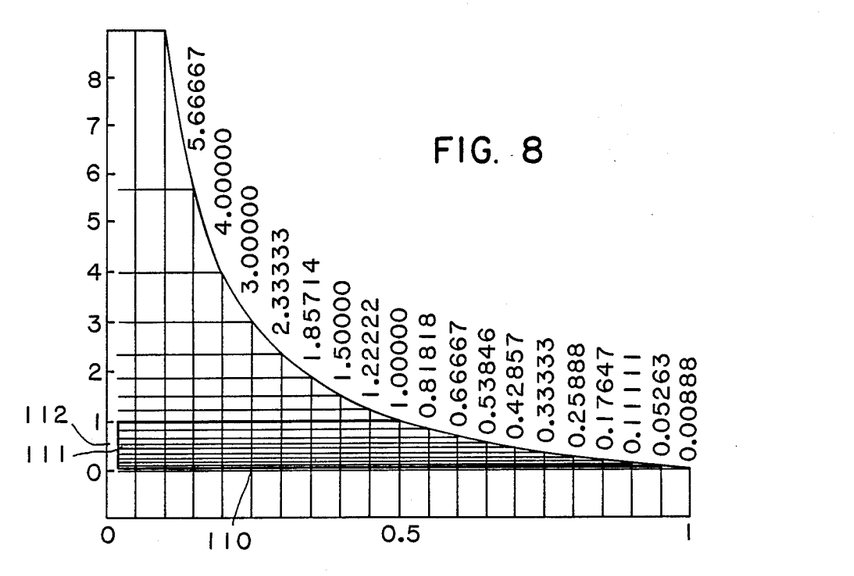
FIG. 8 shows the low pressure region for the systems described below.

As an example, FIG. 8 shows a minimum operating pressure of 0.1 bar lying just above the atmospheric pressure 110, a pressure region 111 to about 1 bar, with a compressor residual volume 112.

Figures 9, 10:
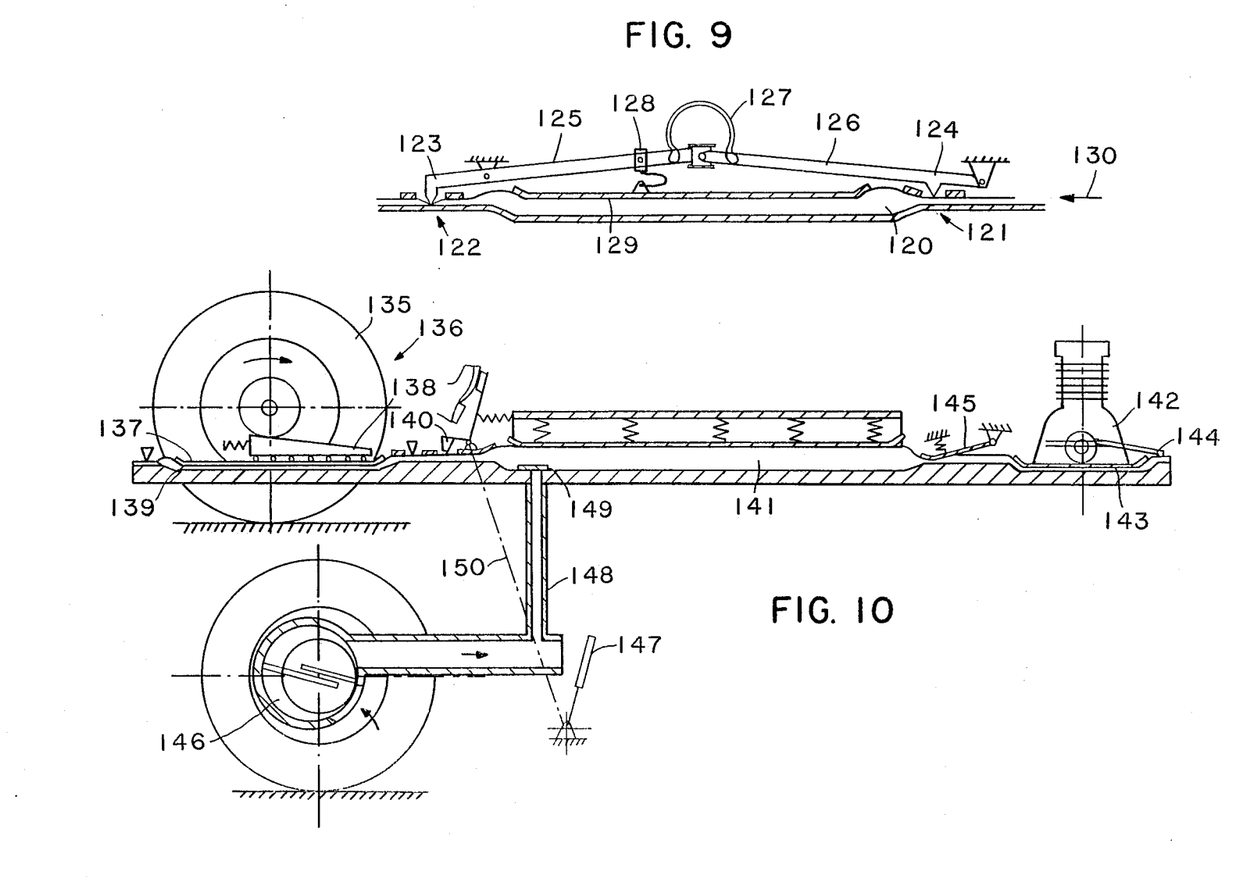
FIG. 9 shows a hose-like force cell with control.
FIG. 10 shows a vehicle drive.

FIG. 9 shows an approximately laminarly flooded hose-shaped force cell 120 with inlet valve 121 and outlet valve 122. The valves are here developed, for example, as alternatively acting clamping points of tilt bodies 123, 124 which are moved by the levers 125, 126 and spring 127 and spring-actuated guide slot 128 in opposite directions and bistably by the stroke plate 129. Force cells developed and controlled in this manner can achieve a relatively high frequency of strokes by the quasi-laminar "cutting-up" of the flow of air 130.

A relative displacement of the switch points of the valves by asymmetric mechanism or switching delay in the case of the outlet valve makes it possible to utilize the energy stored within the pressure fluid in the force cell down to minimum pressure by controlled expansion.

FIG. 10 shows, as another example, the arrangement of the functional parts in the case of a buffered low-pressure vehicle drive with the active wedge (wedge motor). The wheels to be driven, such as 135, are provided with at least one wedge motor 136. The guide plate 137 of the active wedge 138 is, for instance, actuated with a force cell 139, as shown in FIG. 9. The feeding of the compressed air is regulated by travel valve 140.

Such vehicle drives are advantageously operated by buffer storage 141, as a result of which the drive motor 142—dimensioned for the average power requirement—can be substantially smaller than in conventional vehicle drives, since the energy necessary to accelerate the vehicle is available in the pressure accumulator.

The figure shows a feed unit consisting of motor 142, compressor part 143, cam controlled suction valve 144, nonreturn valve 145 and spring-loaded pressure accumulator 141.

The figure shows a view of the coupled operating parts with the use of hose elements by way of example. The same functions can also be developed with other types of elements.

Other pressure-fluid or feed devices can also be used, such as pressurized gas cylinders, free-piston motors, as well as other pressurized gas generators of chemical or thermal type.

The spring-loaded pressure accumulator can, in addition to its simple construction, result in complete utilization of the accumulator space and a flat pressure characteristic curve.

As the compressor, different systems can be used, as well as pressure-gas generators of chemical type.

In order to be able to utilize accumulated potential energy during downhill travel, or kinetic energy, for the braking of the vehicle, one or more brake compressors can be connected to the wheels. In this way, recuperative operation can also be obtained for the filling of the pressure accumulator.

Such brakes can develop a braking force which is progressive with an increase in the speed of rotation.

FIG. 10 shows, by way of example, a vane-cell compressor 146 with brake flap 147, accumulator connection 148 with nonreturn valve 149, coupled by a coupling 150 with travel valve 140.

Figure 11:
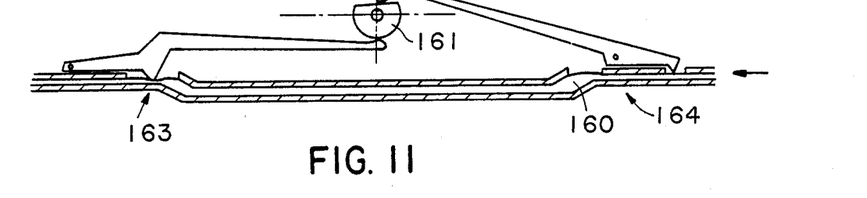
FIG. 11 shows a cam-controlled force cell.

FIG. 11 shows a force cell 160 for a wedge motor, with clamping valve points 163, 164 controlled by cam 161.

Figure 12:
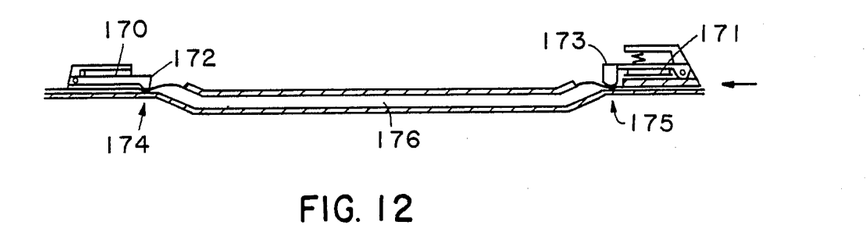
FIG. 12 shows a pneumatically controlled force cell.

FIG. 12 shows a force cell 176 controllable by pneumatic force cells 170, 171 via controlled valve points 174, 175 controlled by tilt members 172, 173.

Vehicle drives of this type result in the possibility of new types of vehicles, with the following important advantages:

light inherent weight;

the motor (motors) travels with optimum speed of rotation and operates to refill of the buffer accumulator, for which reason the latter can be substantially smaller than in ordinary vehicles in which the accelerating power is dependent on the size of the motor.

In the drive shown here, the size of the motor determines only the climbing ability on long inclines.

The acceleration with a wedge motor from the buffer reservoir can be substantially greater than in the case of conventional vehicles.

These properties result in a new generation of light, fast vehicles of low cost of manufacturing and high efficiency with regard to the consumption of energy.

They are excellently suited for city traffic since the energy for starting at a green light comes from the buffer accumulator.

For starting the engine, a drive similar to FIG. 4 can also be used.

Forward and reverse travel can be effected by the direction of rotation of individual motors as well as by the displacement of the active wedge.

Figure 13:
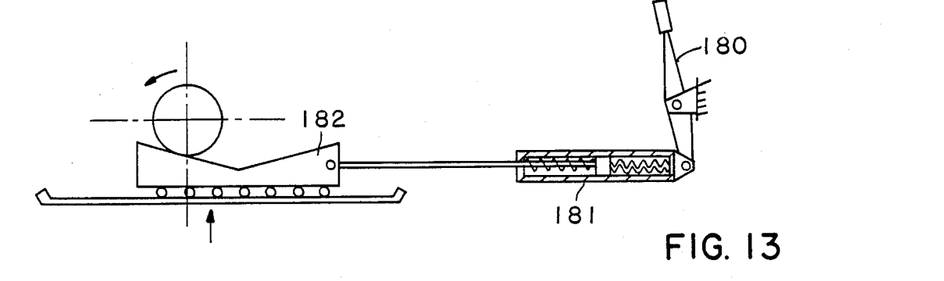
FIG. 13 shows a reversing motion.

FIG. 13 shows an active wedge 182 for optional forward and rearward travel, which can be reversed by lever 180 and spring package 181.

For light vehicles, for instance for city traffic, intraplant transportation of goods and persons, emergency drive or operation in reverse, a hand- or foot-actuated wedge motor can be used.

Figure 14:
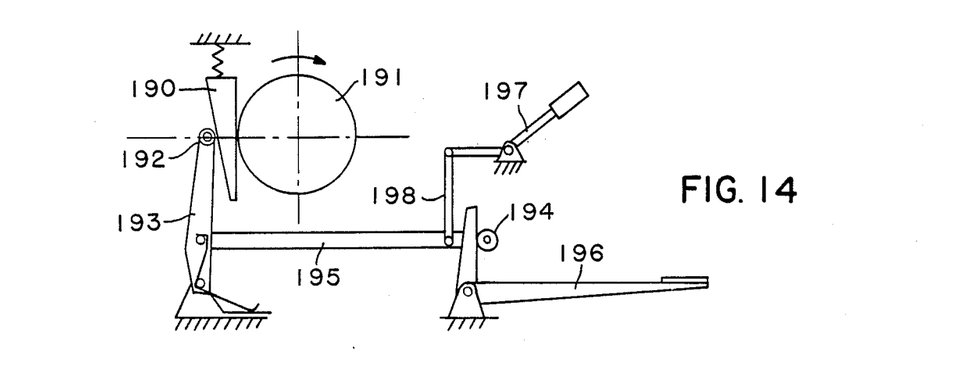
FIG. 14 shows a mechanically driven wedge motor.

FIG. 14 shows a wedge motor with wedge 190 and friction wheel 191 the actuating force of which is produced by roller 192, lever 193, roller 194, linkage coupling element 195 and pedal part 196.

A change in the transmission ratio of the force can be effected by means of hand lever 197 via coupling bar 198.

From the means described above, different types of vehicles can be constructed depending on the purpose of use. They are just as well suited for the construction of 2, 3 and 4-wheel vehicles as for high-speed railways.

Compressed air as source of energy is used today in drive engineering only when its less economical manufacture as compared with electrical energy is compensated for by other specific advantages. The uneconomical nature of compressed air is further increased by the considerable losses of ordinary consuming loads.

The digital-mechanical drives with an active wedge disclosed herein provide new alternatives and substantial advantages with respect to economy in manufacture, operation and energy requirements in all fields of drive engineering.

The embodiments described below can be used to particular advantage in the fields of vehicle construction for road vehicles and trains, airplanes and stationary devices, as drive for blowers, agitators, crushers, grinding, drilling and honing apparatus, household appliances, shafts, spindle-feed apparatus as well as, in general, for devices having one or more parts which are to be driven in rotation or swung.

Figure 15:
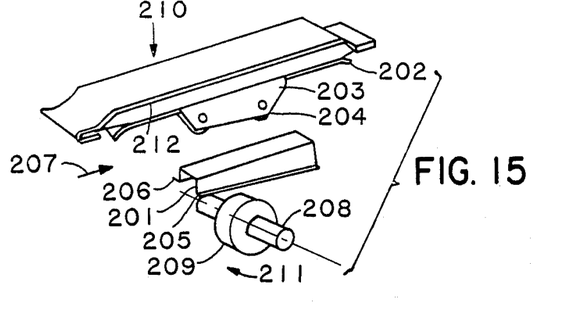
FIG. 15 shows a wedge drive with a linear wedge.

FIG. 15 shows a wedge drive in exploded view with a linear wedge 201 made, for instance, from pressed sheet metal, a centerpiece 203 which is coupled with the pressure plate 202, having bearings 204 which rest during the operating phase on the travel edges 205, 206 of the wedge 201 and displace them in the direction 207. During this displacement phase the inner side of the wedge rests radially on the friction wheel 209 which is connected to shaft 208 and produces thereon a tangential force 211 which corresponds to the drive force 210. The step-up ratio corresponds to the value of the tangent of the wedge angle.

Figure 16:
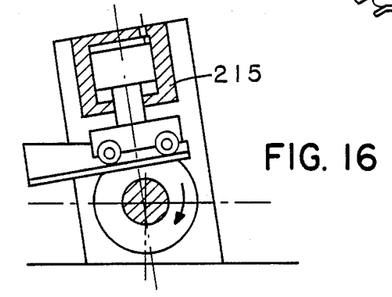
FIG. 16 shows a wedge drive with actuation via a working cylinder.

FIG. 16 shows a wedge drive similar to FIG. 15, with actuation by a work cylinder 215. In contradistinction to the arrangement according to FIG. 15 in which the work cell 212 can take over thrust forces from the inclined arrangement, it is advisable, when using work cylinders, to install them perpendicular to the bearing plane of the wedge in order to avoid unnecessary lateral forces on the piston or the piston rod.

Figure 17:
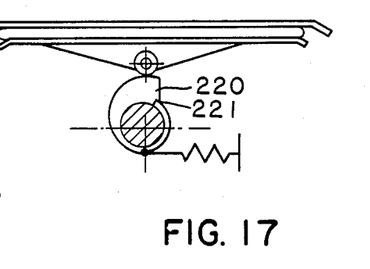
FIG. 17 shows a wedge drive with a ring-shaped wedge.

FIG. 17 shows a wedge drive having a ring-shaped wedge 220, hereinafter referred to as a ring wedge. Similarly to the wedge mechanism of FIG. 15 with linear wedge, the friction-locked coupling between the ring wedge and the part to be driven takes place here via the radial application of force between the ring-wedge bore and shaft 221, the surface of which is of such a nature that the coefficient of friction acting thereon has a higher value than the tangent of the wedge angle, which is identical here to the pitch angle of the spiral.

With such a ring-wedge drive the stepwise transmission of the torque can also take place by a free-wheel clutch.

By the use of free-wheel clutches in embodiments such as FIG. 15, the slight lifting off of the wedge during the return phase is unnecessary.

Figure 18:
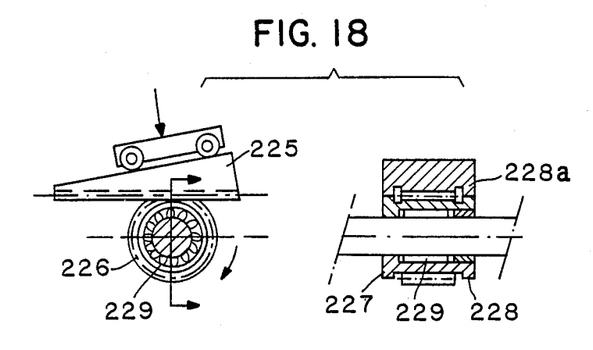
FIG. 18 shows a wedge drive with a wedge which is toothed on the thrust side.

FIG. 18 shows a wedge drive having a wedge 225 which is serrated on the thrust side, with roller 226 which is also serrated, and the has supporting rings 227, 228 which define the pitch circle of the toothing and are adapted to engage the support edges 228a of the wedge which are developed in a manner adapted thereto, and receive the radial force from the wedge drive. The stepwise transmission of the torque takes place here via a freewheel clutch 229 (not shown) installed in the roller.

Figure 19:
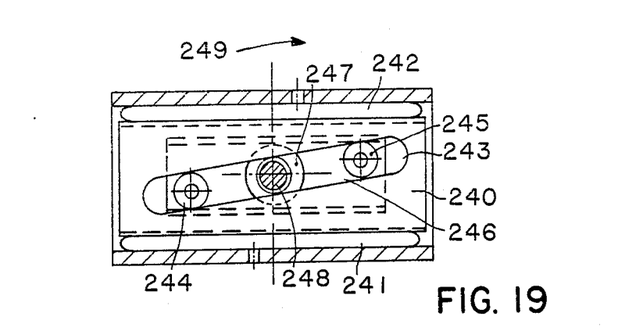
FIG. 19 shows a wedge drive with a slot-guide part.

FIG. 19 shows a wedge drive with a guide-slot part 240 held between two alternately controlled force cells 241, 242. The drive is effected by the inclined slot guide 243 and a transverse carriage 246 guided therein by rollers 244, 245, the carriage being pressed alternately by the force-cells against the friction roller 247 and driving the shaft 248 coupled to same in the direction 249.

Figure 20:
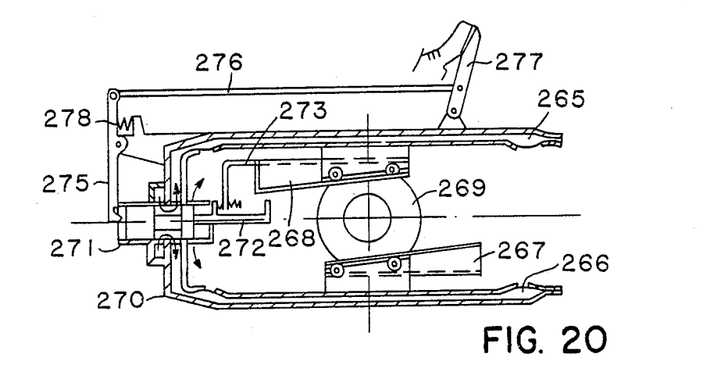
FIG. 20 shows an arrangement of the wedge drive with two force cells which are serially flooded.

FIG. 20 shows an arrangement of the wedge drive with the simultaneous action of two force cells 265, 266 which are arranged in U-shape and inflated in series, having wedges 267, 268 acting on friction wheel 269 held in the housing part 270. The oscillating control of the force cells can take place, for instance, via the control slide 271 which can be controlled bistably by one of the wedges via mechanical feedback 272, 273. Such a control can also be equipped with an adjustable stop for regulating the amount of pressure fluid. The figure also shows such a control for the operation of the travel valve, consisting of stop lever 275, coupling bar 276 and travel pedal 277 with return spring 278.

Figure 21:
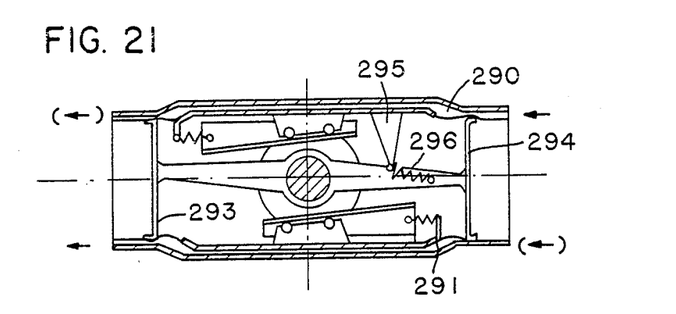
FIG. 21 shows a wedge motor with alternatively flooded work cells.

FIG. 21 shows a wedge motor with alternatively inflated work cells 290, 291. The control of the work cells is effected in this case by the clamping bodies 293, 294 which are mounted on the drive shaft 292 and developed in rocker fashion, the bistable switching thereof by coupling arm 295 and compression spring 296 being indicated.

Figure 22:
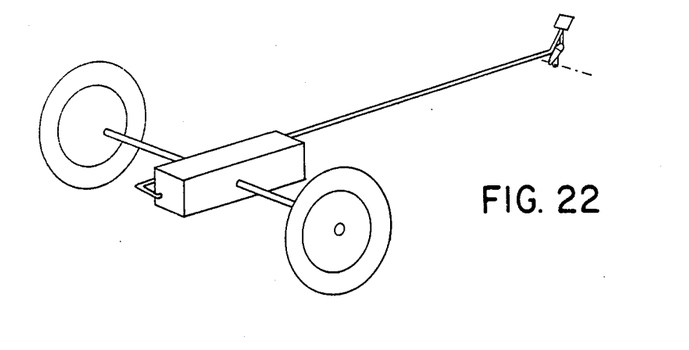
FIG. 22 shows an arrangement of a wedge motor for driving a vehicle axle.

FIG. 22 shows an arrangement of a wedge motor according to FIGS. 19, 20 or 21 for the driving of a vehicle axle. For rail vehicles, a continuous axle can be installed. For steered highway vehicles it is advisable to install a differential in the friction wheel.

Figure 23:
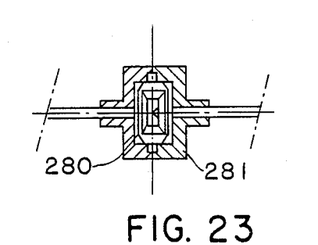
FIG. 23 is a cross section through a drive axle with a differential within the friction roller.

FIG. 23 is a cross section through a drive axle with differential 280 within the friction wheel 281. As a substitute solution, there can also be used two free-wheel clutches or a divided friction wheel with two half-shafts or two motors for individual wheel drive.

The wedge drives shown, especially those with work cells, represent a new generation of vehicle drives of digital type. The extremely slight mechanical losses and the easy formation of large active cell surfaces make possible an operating pressure range of between 0.2 and 1 bar. The extremely low compression losses result in a highly efficient transfer of energy from the low pressure unit to the drive motor and, by the buffered feeding by means of the pressure accumulator, strong acceleration and flexible drive operation.

The presence of pressure fluid simplifies the feeding of power drives, power steering (FIG. 27) and power brakes, as well as the filling of air bags. The low-pressure air used for the drive can also be used for the formation of a boundary layer (FIG. 24), and/or can be blown over the surface of the chassis for reduction of the air drag (FIG. 25).

Figure 24:
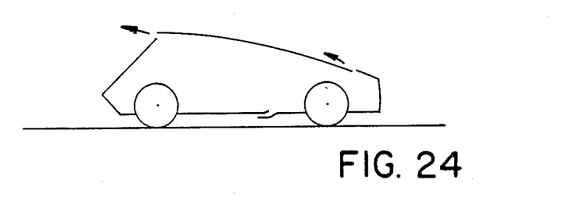
FIG. 24 shows the formation of a boundary layer by blowing out the spent drive air in order to reduce drag.
Figure 25:
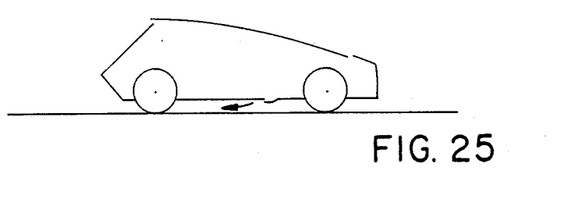
FIG. 25 shows the use of the spent drive air in order to increase the adherence to the ground.

FIGS. 24 and 25 show these possibilities.

For the automatic guiding and positioning of the vehicle, an alternative switching of thrust and brake affords new possibilities.

Figure 26:
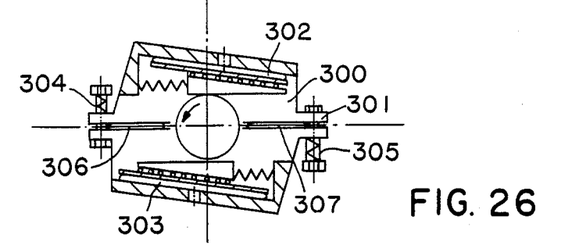
FIG. 26 shows a device for the alternative connecting of thrust and brake.

FIG. 26 shows one such possibility, in which, by way of example, a radially acting calotte-shaped brake 300, 301 is relieved by the force cells 302, 303 during the thrust phase against the springs 304, 305.

For normal travel, the brakes 300, 301 are held open, for instance mechanically or pneumatically.

Figure 27:
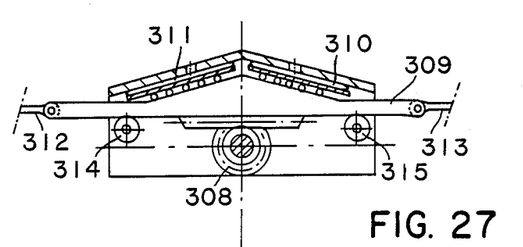
FIG. 27 shows a device for power steering.

FIG. 27 shows a power steering system consisting of the gear wheel 308 connected with the steering column and the rack part 309. The force cells 310 and 311 can be switched as force amplifiers or be used for the automatic steering via sensors. The pressing forces of the wedge mechanism are taken up by rollers 314, 315. Tie rods 312 and 313 are indicated.

Figure 28:
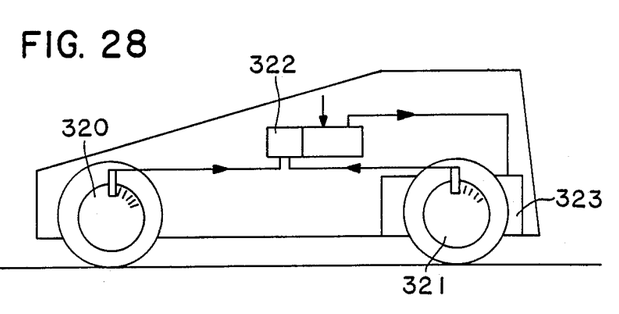
FIG. 28 shows a device for regulating speed and for slippage control during acceleration and braking.

FIG. 28 shows a control for controlling the acceleration and braking as well as travel speed, consisting of pulse generators 320, 321 on the individual drive wheels and on at least one non-driven wheel, which via a frequency/volume interface 322, controls the feeding of energy to the drive motor 323.

Figure 29:
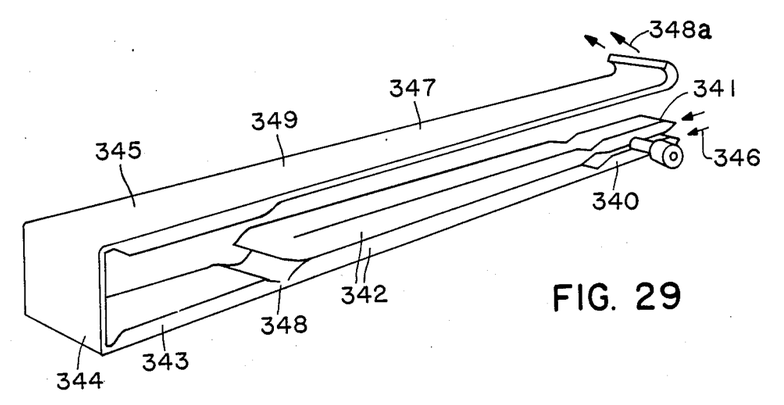
FIG. 29 shows an embodiment of the arrangement of the functional parts consisting of hose elements.

FIG. 29 shows an embodiment for the arranging of the operating parts from hose elements. The pump cells 340, 341, driven for instance via eccentric rollers, convey the pressure fluid into the low-pressure accumulator, with hose elements 342 arranged one above the other, into the oppositely and simultaneously acting force cells 343 and 345 of the motor, connected with channel 344 and, via exhaust channel 347, via a suitable nozzle part, over the chassis surface at 348a. The cyclic control of the motor takes place at the clamping points 348 and 349.

The devices described above permit an optional automating of the travel functions up to unmanned travel in a guided system.

I claim:

1. A device for driving a rotatable part comprising:
   a frame, said rotatable part being mounted on said frame;
   first means mounted on said frame and receiving mechanical energy which is supplied to said device at one side of said first means, and having a drive member at the other side of said first means, such mechanical energy urging said drive member of said first means toward said rotatable part;
   wedge means having a support surface and a drive surface which are angled with respect to each other to form a thicker part and a thinner part of said wedge means, said wedge means being secured to said drive member with the support surface of said wedge means being movable along said drive member, with said drive surface of said wedge means bearing against said rotatable part;
   said wedge means being movable to a first position on said drive member wherein the thicker part of said wedge means is interposed between the drive member and the rotatable part, and to a second position wherein the thinner part of said wedge means is interposed between the drive member and the rotatable part;
   means for biasing the wedge means toward the first position;
   said wedge means being movable against the biasing of said biasing means from said first position to said second position by the urging of said drive member toward said rotatable part, said drive surface thereby moving tangentially of said rotatable part and driving the same.

2. A drive device as in claim 1, further comprising an energy buffer accumulator operatively connected to said first means to receive energy which is supplied to said first means and supply energy to urge said wedge means from said first position to said second position.

3. A drive device according to claim 2, wherein said first means is disposed for being driven by human force.

4. A drive device according to claim 2, further comprising a pressure accumulator and a pump device which diverts a part of the energy supplied to the first means to said pressure accumulator for charging thereof.

5. A drive device according to calim 2, further comprising a control valve and a pressure regulator operatively connected to the buffer accumulator for controlling release of energy therefrom.

6. A drive device according to claim 2, further comprising means which effect the automatic load-dependent change of the wedge angle of said drive surface with respect to said rotatable part.

7. A device according to claim 2, wherein said buffer accumulator is operatively connected to said first means, by means including pneumatically controlled valve means.

8. A device according to claim 2, wherein the buffer accumulator is pneumatic.

9. A drive device as in claim 1, wherein said first means is pivotally mounted on said frame at a pivot point and receives said mechanical energy on one side of said pivot point, while said drive member is on a portion of the first means on the other side of said pivot point.

10. An arrangement for driving a bicycle axle, comprising:
    a frame on which said axle is rotatably mounted;
    a lever pivotally mounted on said frame, having a pedal end which is located for being pushed downward by the foot of a rider, and a drive end which moves upward toward the axle when said pedal end moves downward;
    a wedge-shaped body mounted for movement along the drive end of the lever, with a support side toward the lever and a drive side engaging the axle, the wedge-shaped body having a thicker end and a thinner end with the thinner end being oriented toward the pedal end of the lever,
    the wedge-shaped body being movable along the lever from a first position with the thicker end of the wedge-shaped body between the lever and the axle, to a second position with the thinner end of the wedge-shaped body between the lever and the axle, when the drive end of the lever moves upward toward the axle; and
    means for biasing the wedge-shaped body toward the first position;
    the wedge-shaped body moving tangentially of the axle as it moves from the first position to the second position against the biasing of said biasing means, thereby driving said axle.

11. An arrangement as in claim 10, further comprising an energy accumulator operatively connected to said pedal end of said lever which receives energy when said pedal end is pushed downward, and which supplies such energy to said drive end of said lever to further urge the same upward toward the axle.

12. An arrangement as in claim 11, further comprising pump cell means for receiving mechanical energy when said pedal end is pushed downward;
    second means for conveying pressure fluid from said pump cell means to said accumulator;
    force cell means arranged for supplying mechanical energy to said drive end of said lever to move the same upward toward said axle by receiving and amplifying the pressure of a pressure fluid; and
    third means for conveying pressure fluid from said accumulator to said force cell means.

13. An arrangement as in claim 12, further comprising non-return valve means in said second means.

14. An arrangement as in claim 13, wherein said third means includes control valve means actuated by the downward movement of said pedal end of said lever.

15. An arrangement as in claim 14, wherein said third means includes pressure regulator means which is operable by the rider of said bicycle.

16. An arrangement as in claim 10, wherein the drive side of the wedge-shaped body engaging the axle has an involute shape, thereby presenting a constant thrust angle of said drive side toward said axle during movement of said wedge-shaped body.

17. An arrangement as in claim 10, wherein said biasing means comprises a compression spring.

18. A device for driving a rotatable part comprising:
a frame, said rotatable part being mounted on said frame;
first means mounted on said frame and having means for receiving mechanical energy which is supplied to said device, and for urging a drive member of said first means toward said rotatable part in response to said mechanical energy;
wedge means having a support surface and a drive surface which are angled with respect to each other to form a thicker part and a thinner part of said wedge means; said wedge means being secured to said drive member with the support surface of said wedge means being movable along said drive member, with said drive surface of said wedge means bearing against said rotatable part;
said wedge means being movable to a first position on said drive member wherein the thicker part of said wedge means is interposed between the drive member and the rotatable part, and to a second position wherein the thinner part of said wedge means is interposed between the drive member and the rotatable part;
means for biasing the wedge means toward the first position;
said wedge means being movable against the biasing of said biasing means from said first position to said second position by the urging of said drive member toward said rotatable part, said drive surface thereby moving tangentially of said rotatable part and driving the same.

19. A drive device as in claim 18, wherein said first means serves to produce and control at least one force acting radially to the rotatable part and to convert said force to torque via said wedge means and drive member.

20. A device as in claim 19, wherein said first means comprises a force cell.

21. A device as in claim 19, wherein said first means comprises a piston and cylinder.

22. A drive device as in claim 18, further comprising a free-wheeling clutch disposed for transferring torque from the wedge means to the rotatable part.

23. A drive device as in claim 18, wherein said wedge means comprises a wedge which has toothing, which engages corresponding toothing on said rotatable part, said respective toothings being in respective support surfaces of said wedge and rotatable part.

24. A drive device as in claim 18, further comprising a differential connected to the rotatable part.

25. A drive device as in claim 18, wherein said means for receiving mechanical energy receives mechanical energy which is supplied to said device at one side of said first means; and said drive member is at the other side of said first means.

26. A drive device as in claim 25, wherein said first means is pivotally mounted on said frame at a pivot point and receives said mechanical energy on one side of said pivot point, while said drive member is on a portion of the first means on the other side of said pivot point.

27. A drive device as in claim 26, wherein:
said rotatable part comprises a bicycle axle;
said first means comprises a lever pivotally mounted on said frame, having a pedal end which is located for being pushed downward by the foot of a rider; and a drive end which moves upward toward the axle when said pedal end moves downward; and
said wedge means comprises a wedge-shaped body mounted for movement along the drive end of the lever, with a support side toward the lever and a drive side engaging the axle, the wedge-shaped body having a thinner end oriented toward the pedal end of the lever.

28. A device as in claim 18, wherein said frame is the frame of a passenger vehicle; the rotatable part is an axle of a wheel of the vehicle; the vehicle has means for generating and supplying said mechanical energy to said device; and the device drives the wheel.

29. The vehicle of claim 28, wherein:
said first means comprises a force cell on said frame, said force cell having means for receiving mechanical energy from a pressure fluid supplied to said force cell by pressure fluid supply means on said vehicle; and in response to said mechanical energy, urging said drive member on said force cell toward said wedge means, to urge said wedge means against said axle.

30. The vehicle of claim 29, wherein said wedge means comprises a wedge-shaped body mounted so as to be movable along said drive member on said force cell, with a support side toward the drive member and a drive side engaging the axle.

31. The vehicle of claim 30, further comprising a second wedge-shaped body also mounted so as to be movable along said drive member on said force cell, said second wedge-shaped body being oriented so as to drive the axle in the opposite direction to said first-mentioned wedge-shaped body, and means for selectively engaging one of said first and second wedge-shaped bodies with said axle.

32. The vehicle of claim 30, further comprising transmission means for setting the force applied by said wedge-shaped body to said axle.

33. The vehicle of claim 29, wherein said force cell is elongated and is disposed around said rotatable part; and said wedge means comprises at least two wedge-shaped bodies, both movable along said drive member of said force cell, said drive member being comprised on a surface of said force cell which is disposed around said rotatable joint, and said wedge-shaped bodies each having a support side forward the drive member and a drive side engaging the axle.

34. The vehicle of claim 33, further comprising control means for controlling the supply of pressure fluid to respective portions of said force cell adjacent to said two wedge-shaped bodies.

35. The vehicle of claim 34, wherein said control means causes said two wedge-shaped bodies to be urged toward said axle alternately.

36. The vehicle of claim 34, wherein said control means causes said two wedge-shaped bodies to be urged toward said axle simultaneously.

37. The vehicle of claim 33, wherein said control means comprises controllable clamps on the force cell.

38. The vehicle of claim 29, wherein said pressure fluid is pressurized air, and further comprising means for discharging said air over the outer surface of the vehicle so as to reduce drag.

39. The vehicle of claim 29, further comprising buffer-accumulator means for storing said pressure fluid before it is supplied to such force cell.

40. The vehicle of claim 39, further comprising means on said buffer-accumulator means for alternately admitting pressure fluid and discharging pressure fluid.

41. The vehicle of claim 40, wherein said buffer-accumulator means comprises an elongated cell having two ends; and said means for alternately admitting and discharging pressure fluid comprises valves at respective ends of said elongated cell and means controllable by an operator of the vehicle for alternately closing and opening said valves.

42. The vehicle of claim 39, further comprising a non-return valve for admitting pressure fluid to said buffer-accumulator means.

43. The vehicle of claim 39, further comprising a valve controllable by an operator of the vehicle for discharging pressure fluid from said buffer-accumulator means.

44. The vehicle of claim 43, further comprising a non-return valve for admitting pressure fluid to said buffer-accumulator means.

45. The vehicle of claim 28, further comprising a brake on a wheel of said vehicle, wherein said means for generating and supplying mechanical energy also supplies mechanical energy to said brake.

46. The vehicle of claim 45, wherein said mechanical energy is generated and supplied in the form of a pressure fluid; and further comprising means powered by kinetic energy of the vehicle for compressing said pressure fluid.

47. The vehicle of claim 46, further comprising buffer-accumulator means for storing said pressure fluid before it is supplied to said force cell; and means supplying said pressure fluid compressed by said means powered by kinetic energy, to said buffer-accumulator means.

48. The vehicle of claim 45, wherein said mechanical energy is generated and supplied in the form of a pressure fluid; and further comprising means for controlling the supply of said pressure fluid to said brake.

49. The vehicle of claim 45, further comprising means for causing mechanical energy to be applied alternately to said driving device and to said brake.

50. The vehicle of claim 49, wherein said last-mentioned means is controllable by an operator of said vehicle.

51. The vehicle of claim 28, further comprising means for storing said mechanical energy before it is supplied to said device.

52. The vehicle of claim 51, wherein said mechanical energy is generated and supplied in the form of a pressure fluid, and said storing means includes buffer-accumulator means for said pressure fluid.

53. A device as in claim 18, wherein said wedge means comprises a spiral-shaped wedge disposed about the circumference of said rotatable part and engaging said drive member.

54. A device as in claim 18, wherein said rotatable part is an axle; and further comprising a plurality of fan blades mounted on said axle.

55. A device as in claim 18, further comprising means for adjusting the angle between said support surface and drive surface of said wedge means as a function of the force applied by said drive surface to said rotatable part.

* * * * *